(12) United States Patent
Mowbray et al.

(10) Patent No.: US 7,685,899 B2
(45) Date of Patent: Mar. 30, 2010

(54) SINGLE CLUTCH TRANSMISSION

(75) Inventors: Graham Mowbray, New South Wales (AU); Ric Tamba, New South Wales (AU); Steve Tapper, New South Wales (AU)

(73) Assignee: Nautitech Pty Ltd., New South Wales (AU)

( * ) Notice: Subject to any disclaimer, the term of this patent is extended or adjusted under 35 U.S.C. 154(b) by 719 days.

(21) Appl. No.: 10/565,473

(22) PCT Filed: Jul. 21, 2004

(86) PCT No.: PCT/AU2004/000978

§ 371 (c)(1),
(2), (4) Date: Dec. 5, 2006

(87) PCT Pub. No.: WO2005/007504

PCT Pub. Date: Jan. 27, 2005

(65) Prior Publication Data

US 2007/0125192 A1 Jun. 7, 2007

Related U.S. Application Data

(60) Provisional application No. 60/507,005, filed on Sep. 28, 2003.

(30) Foreign Application Priority Data

Jul. 22, 2003 (AU) .............................. 2003903788
Mar. 5, 2004 (AU) .............................. 2004901167

(51) Int. Cl.
*F16H 3/08* (2006.01)
*F16H 57/00* (2006.01)

(52) U.S. Cl. .............................. 74/329; 440/75; 74/404
(58) Field of Classification Search .................. 74/329, 74/333, 404; 440/75, 86
See application file for complete search history.

(56) References Cited

U.S. PATENT DOCUMENTS

| | | | | | |
|---|---|---|---|---|---|
| 2,219,812 | A | * | 10/1940 | Hochstetter | ............... 74/336 R |
| 3,095,757 | A | * | 7/1963 | Thoma | ..................... 477/68 |
| 4,323,354 | A | * | 4/1982 | Blanchard | ..................... 440/75 |
| 4,331,432 | A | * | 5/1982 | Blanchard | ..................... 440/75 |
| 4,595,371 | A | * | 6/1986 | Heston | ......................... 440/75 |
| 6,350,165 | B1 | | 2/2002 | Neisen | |

FOREIGN PATENT DOCUMENTS

GB 596307 A * 1/1948

* cited by examiner

*Primary Examiner*—Roger Pang
(74) *Attorney, Agent, or Firm*—Blakely, Sokoloff, Taylor & Zafman LLP (57) ABSTRACT

A two speed transmission including an input shaft; a lay shaft spaced from the input shaft; a first gear train connecting the input shaft to the lay shaft; a second gear train connecting the lay shaft to an output shaft, the gear train including a one way clutch or similar; and a clutch for engaging the input shaft with the output shaft. When the clutch is disengaged, power is transmitted from the input shaft via the gear trains and the lay shaft via the one way clutch to the output shaft which typically provides first or low gear for use in low speed maneuvering or where greater torque is required. With the clutch engaged, power may be transmitted from the input shaft directly to the output shaft to provide a second gear for when the watercraft is cruising.

6 Claims, 8 Drawing Sheets

SINGLE CLUTCH TRANSMISSION

The present patent application is a non-provisional application of International Application No. PCT/AU2004/000978, filed Jul. 21, 2004 and U.S. Provisional Application No. 60/507,005, filed Sep. 28, 2003.

FIELD OF THE INVENTION

The present invention relates to a transmission and in particular, the invention relates to an automated manual transmission which is particularly suited for use in marine applications.

CROSS-REFERENCE TO RELATED APPLICATIONS

This invention claims priority from Australian provisional application No 2003903788 and also from U.S. provisional application No. 60/507,005. The entire contents of both documents are incorporated by reference. Priority is also claimed from a related provisional application filed by the same applicant/assignee Australian provisional application number 2004901167 the entire contents of which are also incorporated by reference.

BACKGROUND OF THE INVENTION

In most existing marine drives in watercraft, a marine engine is coupled to a propeller via a gear box which provides a single gear ratio. The speed of the watercraft is controlled by controlling the engine speed via a throttle. Generally speaking, watercraft are geared so that they run most efficiently at their intended cruising speed. A large yacht may be designed to cruise at 35 to 40 knots and is thus geared to be most efficient and controllable at or around that speed. However a problem with this arrangement is that such craft are very difficult to operate at the low speeds that may be required for example, when docking the craft. It is very difficult to dock a boat safely if, for example, the lowest speed that the boat will satisfactorily travel at, is around 10 knots. It is also, in some cases, desirable to have a low gear ratio for applications where increased torque is required, with a higher gear ratio for high speed operation.

Although a number of multi-speed drive transmissions have been proposed for watercraft, they suffer from a number of problems. For example, U.S. Pat. No. 6,350,165 discloses a watercraft which incorporates a two forward speed plus one reverse speed transmission. The transmission is based on a planetary gear apparatus and is consequently relatively high cost. The transmission has a further problem in that because of the way the gearing is arranged, it is not possible to vary the gear ratios easily, since all the gear wheels must be changed. It is thus harder to package and adapt planetary gearing systems to suit different applications, engine sizes and the like.

Examples of the present invention address or alleviate one or more of the problems of the prior art.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In accordance with one aspect of the present invention, there is provided a two speed transmission including:
   an input shaft;
   a lay shaft spaced from the input shaft;
   a first gear train connecting the input shaft to the lay shaft;
   a second gear train connecting the lay shaft to an output shaft the gear train including a one way clutch;
   a first clutch for engaging the input shaft with the output shaft the arrangement being such that when the output shaft is disengaged from the input shaft forward drive is transmitted to the output shaft via the first and second gear trains and the lay shaft; and
   a second clutch for selectively disengaging the lay shaft from the first gear train to enable reverse drive to be transmitted from the input shaft to the output shaft by the first clutch.

In accordance with another aspect of the present invention, there is provided a two speed transmission system for a marine craft comprising:
   an input shaft;
   an output shaft,
   a first gear train for connecting the input shaft to the output shaft for driving the same in a first forward gear;
   a second gear train connecting the input shaft to the output shaft for driving the output shaft in a second forward gear;
   a friction clutch for selecting between the first and second gears;
   a one-way clutch for allowing overrun of the first gear train when the second gear is selected; and
   means for disengaging the one-way clutch to allow reverse drive to be transmitted from the input shaft to the output shaft.

A compact two speed transmission system for a marine craft comprises:
   an input shaft;
   an output shaft,
   a first gear train for connecting the input shaft to the output shaft for driving the same in a first gear;
   a second gear train connecting the input shaft to the output shaft for driving the output shaft in a second gear; and
   a single clutch means for connecting the input shaft to the output shaft at a gear ratio other than one to one.

The output shaft and input shaft may be parallel and linked by gear trains for first and second gears.

A two speed transmission includes:
   an input shaft;
   a lay shaft spaced from the input shaft;
   a first gear train connecting the input shaft to the lay shaft;
   a second gear train connecting the lay shaft to an output shaft the gear train including a one way clutch; and
   a clutch for engaging the input shaft with the output shaft the arrangement being such that when the output shaft is disengaged from the input shaft power is transmitted to the output shaft via the first and second gear trains and the lay shaft.

A dog clutch is preferably provided for disengaging the lay shaft when in reverse.

When the clutch is disengaged, power is transmitted from the input shaft via the gear trains and the lay shaft via the one way clutch to the output shaft which typically provides first or low gear for use in low speed maneuvering or where greater torque is required. With the clutch engaged, power may be transmitted from the input shaft directly to the output shaft to provide a second gear for when the watercraft is cruising.

Examples of the transmission system have the advantage of being extremely compact and of having only a single friction clutch, thus providing reduced drag compared with transmission systems incorporating more than one friction clutch. Advantageously, by virtue of the one way clutch, even if the system fails, forward drive is able to be transmitted via the transmission in at least one of the two speeds so that the system has a "limp-home" function enabling the boat owner to get the boat home.

In example transmission systems, means for disengaging the one way clutch, to allow the output shaft to be run in reverse, may be mechanically, hydraulically or electromechanically operated.

Typically, a control system is provided for controlling slippage of the friction clutch. The slip speed of the clutch may be controlled by monitoring both the input shaft speed and the output propeller speeds. The output speed may be used as an input to control the slip speed, allowing for clutch slip at any speed and torque.

BRIEF DESCRIPTION OF THE DRAWINGS

A specific example of the present invention will now be described by way of example only and with reference to the accompanying drawings in which.

DETAILED DESCRIPTION

Figure 1:
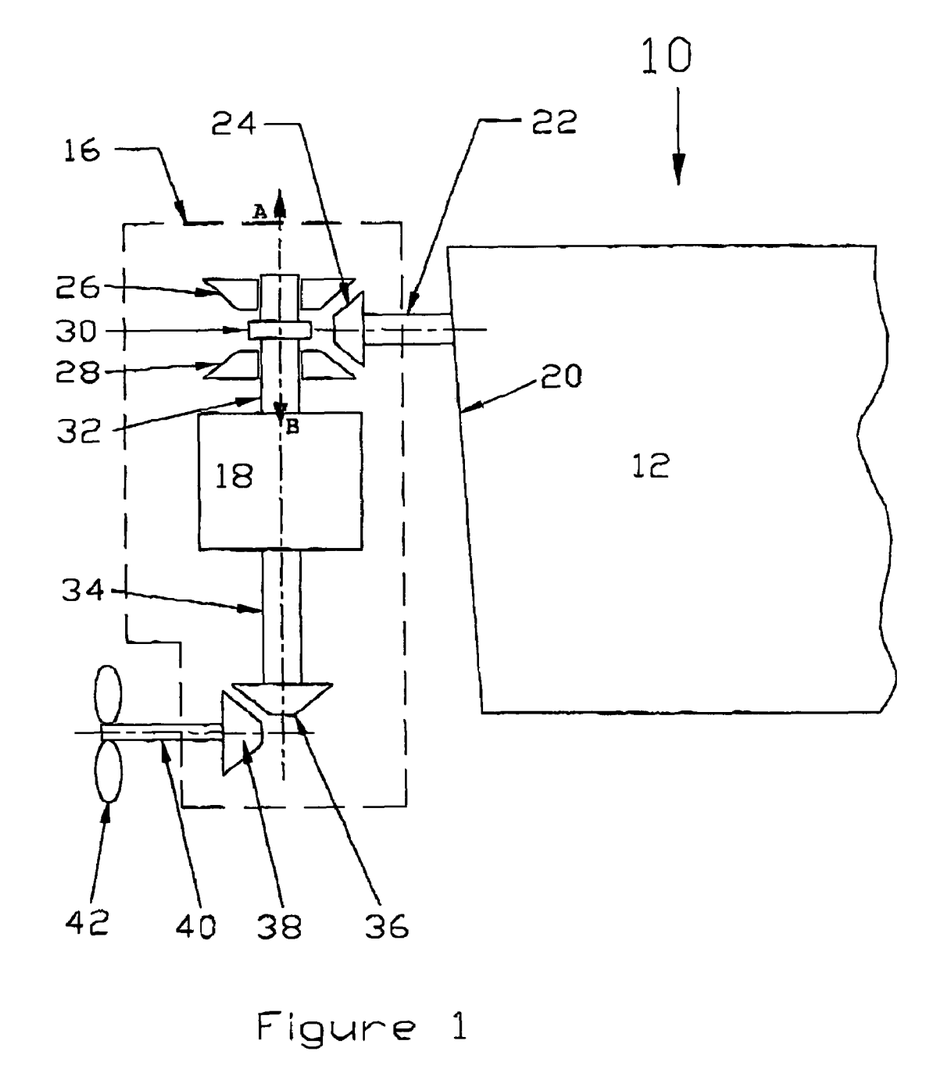
FIG. 1 is a schematic diagram of the stern of a watercraft including a stern drive transmission of the type commonly referred to as a bravo drive by some manufacturers.

Referring to the drawings, FIG. 1 shows the stern of a watercraft 10 having a hull 12. A stern drive unit 16 incorporating a single friction clutch automated manual transmission 18 is located behind the transom 20 of the watercraft 10, an engine (not shown) is located inside the hull 12 and an output shaft 22 from the engine projecting generally horizontally from the stern of the watercraft provides power to the stern drive unit 16. This type of marine propulsion system is also commonly referred to as an "inboard/outboard drive".

The output shaft 22 of the watercraft 10 spins about a generally horizontal axis. A bevel gear 24 is fixed to the end of the output shaft 22. The bevel gear 24 defined at the end of the output shaft 22 meshes with forward and reverse bevel gears 26, 28 respectively and a dog, or similar, clutch 30 moves in the direction of arrow "A" to connect a vertical output shaft 32 with the forward bevel gear 26, or in the direction "B" to connect the vertical output shaft 32 with the reverse bevel gear 28, or vice versa depending on whether a right or left hand propeller is fitted. A lower part 34 of the vertical output shaft 32 is operatively connected to a further pair of meshing bevel gears 36, 38 which convert the vertical axis movement of the lower part 34 to a generally horizontal shaft 40 driving a propeller 42. The above arrangement is typical of existing marine stern drive systems and is commonly known in some areas as a "Bravo" drive.

Figure 6:
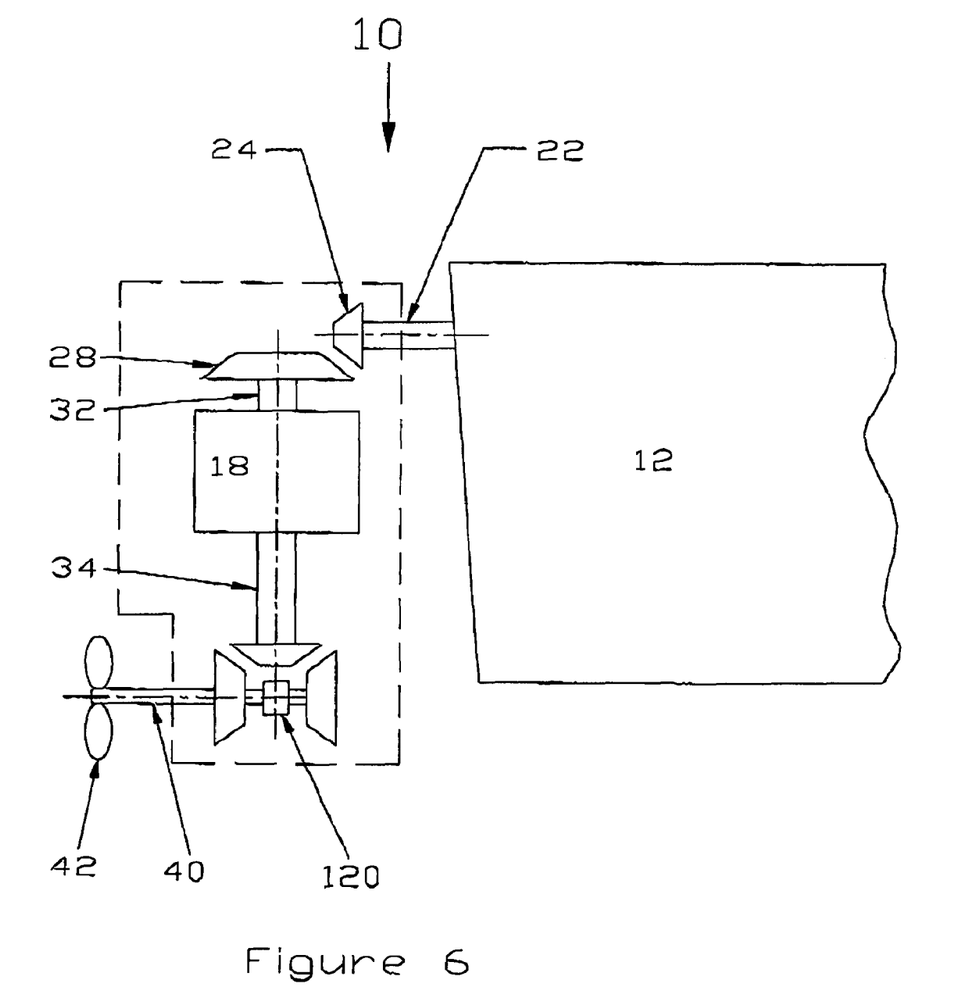
FIG. 6 is a schematic diagram of the stern of a watercraft having a stern drive transmission of the type commonly referred to as a bravo drive by some manufacturers.

FIG. 6 illustrates the system in use with an "alpha" type drive instead of the bravo drive shown in FIG. 1. In this case the output shaft 22 is directly connected to vertical input shaft 32 via bevel gears 24 and 28 and forward and reverse are provided at the lower end of the drive adjacent the propeller 42 selected via a dog clutch 120 or similar. The present invention is concerned with a transmission system and control means which not only provide two speed drive for the watercraft but also provide a number of other advantages over existing marine transmission systems.

Figure 2:
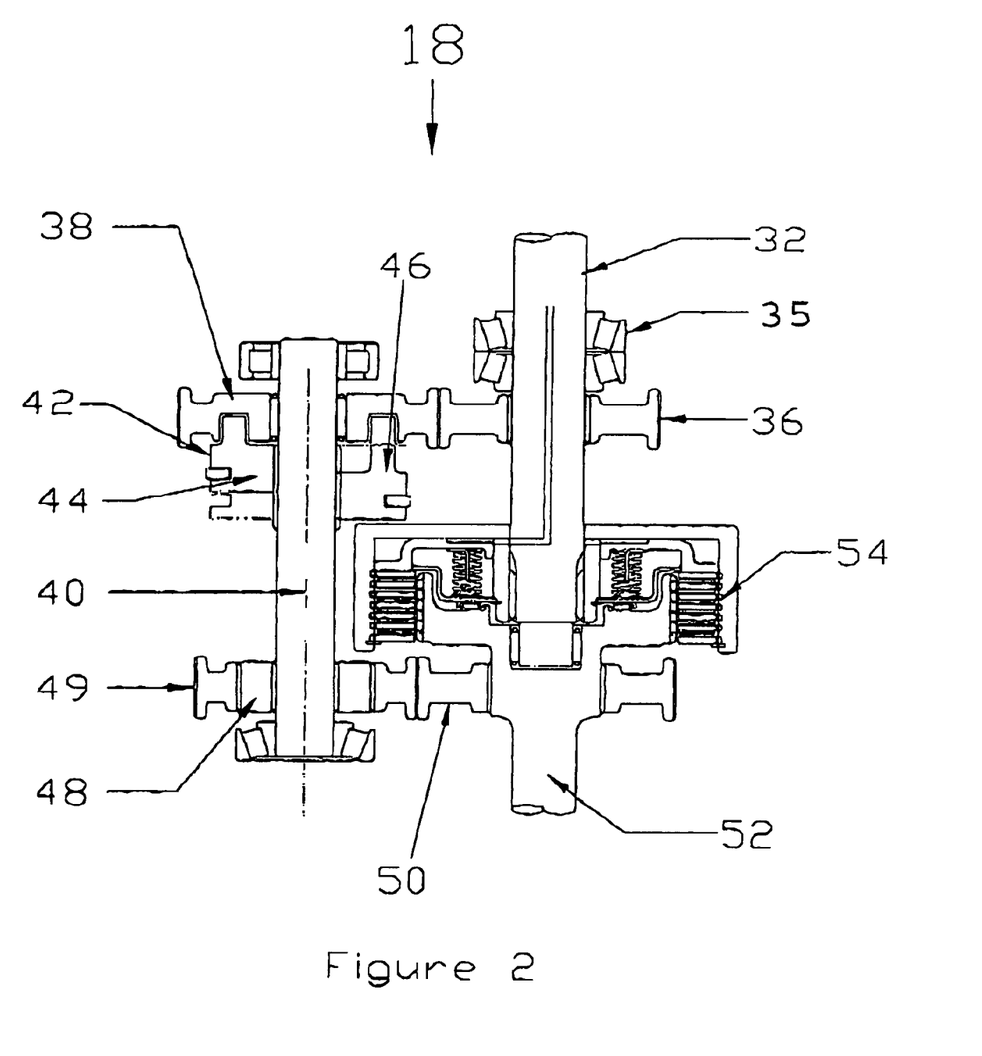
FIG. 2 is a schematic diagram of a first transmission.

FIG. 2 shows a first example of a single friction clutch automated manual transmission 18. The vertical output shaft 32 from the bravo drive of FIG. 1 is the input shaft 32 for the transmission 18. Bearings 35 support the shaft 32. A gear 36 is mounted on the exterior of the input shaft 32. Gear 36 meshes with a gear 38 mounted on a lay shaft 40 extending parallel to the input shaft 32. The gear 38 may either be engaged with the lay shaft 40 for rotation therewith or free to spin about the lay shaft depending on the position of a second clutch in the form of shift mechanism 42. The shift mechanism 42 is shown in two positions in FIG. 2 engaged at 44 and disengaged at 46. The shift mechanism 42 may be operated hydraulically, mechanically, or electrically or by any other suitable means.

A one way clutch 48 is fixed to the lower end of the lay shaft 40 and a gear 49 encompassing the one way clutch 48 meshes with a gear wheel 50 fixed to an output shaft 52. The one way clutch 48 will hold torque in one direction and freely rotate in the other.

A friction clutch 54 is located between the upper end of the output shaft 52, and the lower end of the input shaft 32 for engaging the two shafts. When the clutch 54 is disengaged, power is transmitted from the input shaft 32 via gears 36, 38 to the lay shaft 40 and thence, via the one way clutch 48 to the output gear shaft 52 via gear 50. This provides first gear for use in low speed maneuvering or where greater torque is required. When the clutch 54 is engaged, power is transmitted from the input shaft 32 directly to the output shaft 52. This provides second gear for when the watercraft is cruising. The gears 36, 38 remain meshed, and gear 49 mounted about the lay shaft 40 remains still meshed with the gear 50 and in this condition the lay shaft 40 will rotate more slowly than the shaft 52 and the one way clutch 48 will over run.

With this transmission 18 either first or second gear is always engaged depending on the position of the clutch 54. This avoids the problem of torque interrupt.

In order to run the output gear shaft 52 in reverse with a bravo type drive, it is necessary to provide mechanical or other means of disengaging the one way clutch 48 by for example, mechanically, hydraulically or electromechanically disengaging the lay shaft 40 from the input shaft 32. In the described example this function is provided by the shift mechanism 42. In reverse, gear 50 will drive the lay shaft 40 through the one way clutch 48, but with gear 38 disengaged by the shift mechanism 42 the lay shaft 40 simply spins freely with respect to the gear 38 so as to prevent locking of the transmission due to both ratios being engaged. The shift mechanism 42 is required to prevent the first gear drive train operating in reverse in this way, thereby enabling reverse drive to be transmitted from the input shaft 32 to the output shaft 52 through the clutch 54.

Figure 3:
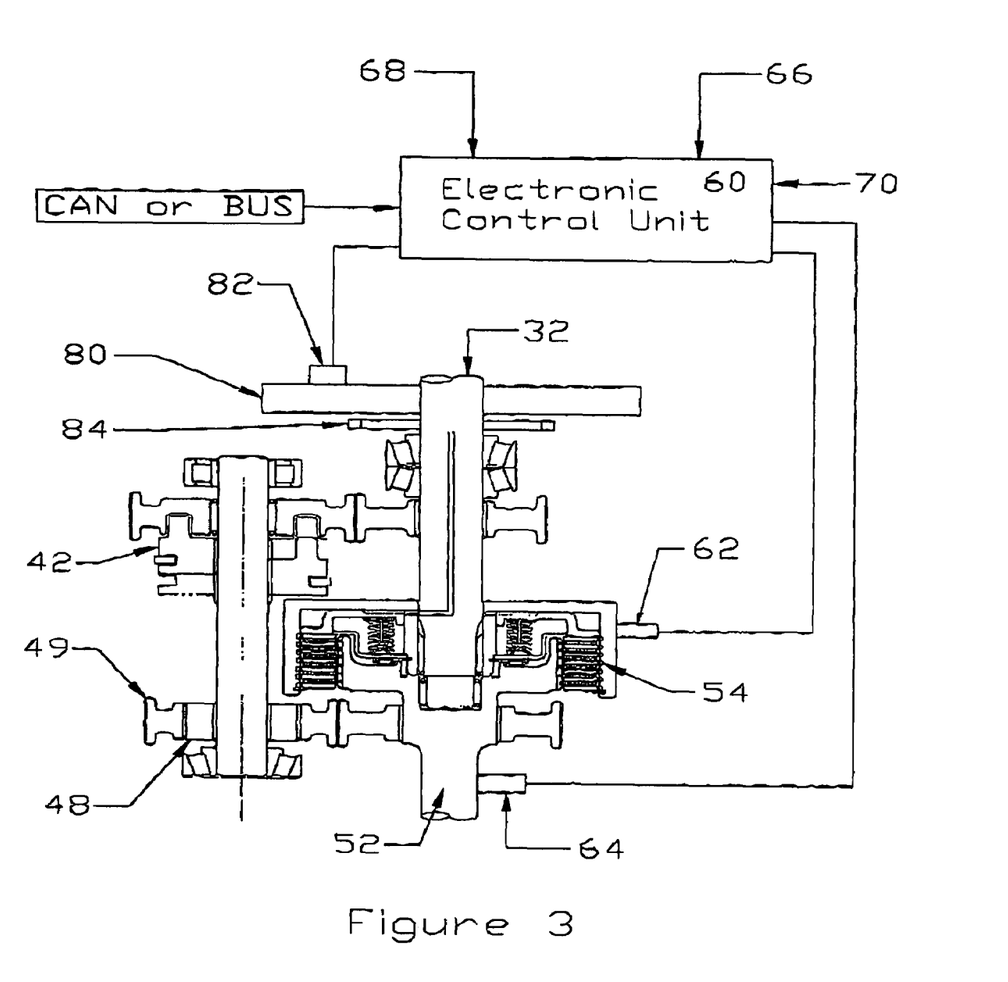
FIG. 3 shows the transmission of FIG. 2 with a control system superposed.

A control system illustrated in FIG. 3 is provided for controlling the transmission 18. The control system includes an electronic control unit (ECU) 60 linked to various sensors.

The system includes sensors 62 and 64 measuring the speed of the input shaft 32 and output shafts 52 respectively and sensors 68 providing information about the position of the gears, sensors 66 providing information about the engine's throttle position, and sensors 70 providing information concerning the temperature of the systems hydraulic fluid. Alternatively, some of this information can be collected off the common vessel/engine BUS or CAN 100.

FIG. 3 also shows a valve body 80 containing a control valve and an electro-hydraulic solenoid 82 to activate control of clutch slip as described in more detail below. The position of the solenoid 82 is also fed to the ECU 60. FIG. 3 also illustrates a hydraulic pump 84 used for maintaining hydraulic pressure in the system's hydraulic controls, but this hydraulic source could be externally supplied via existing pumps, a hydraulic pump or otherwise. The system also includes position sensors for sensing the position of the gear engagement states.

The system of clutch slipping may also be used for docking functions where very low speeds of the order of a few knots may be desired and wherein clutch slip may be used to dissipate excess rotational speed of the output shaft to allow slower movement of the boat whilst maintaining throttle speed. The control system controls the output speed through control of piston pressure via an electrical signal sent to the electro hydraulic solenoid 82. The system may receive electronic requests for the various modes that the system operates in, such as docking, trolling, hi-launch energy, from any suitable input such as buttons, levers, radio controls, or the like.

The one way clutch 48 may be a roller clutch, sprag clutch, ratchet clutch or similar.

Figure 4:
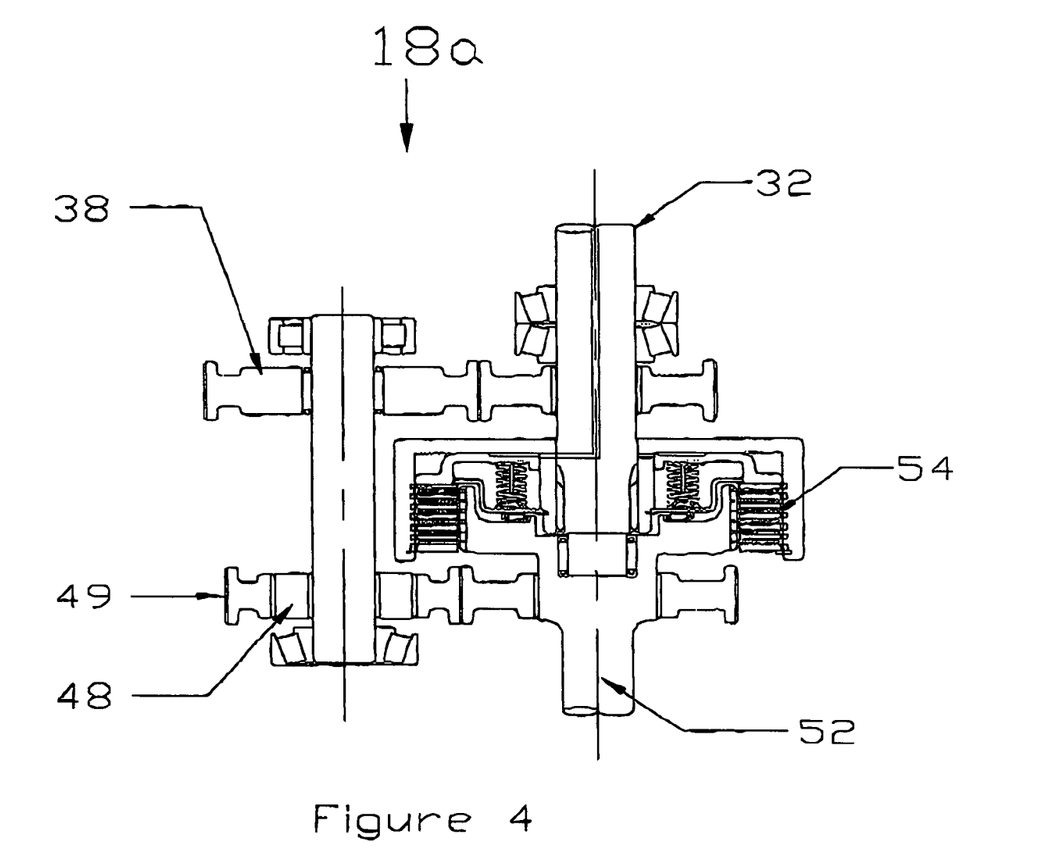
FIG. 4 is a schematic diagram of a second transmission.
Figure 5:
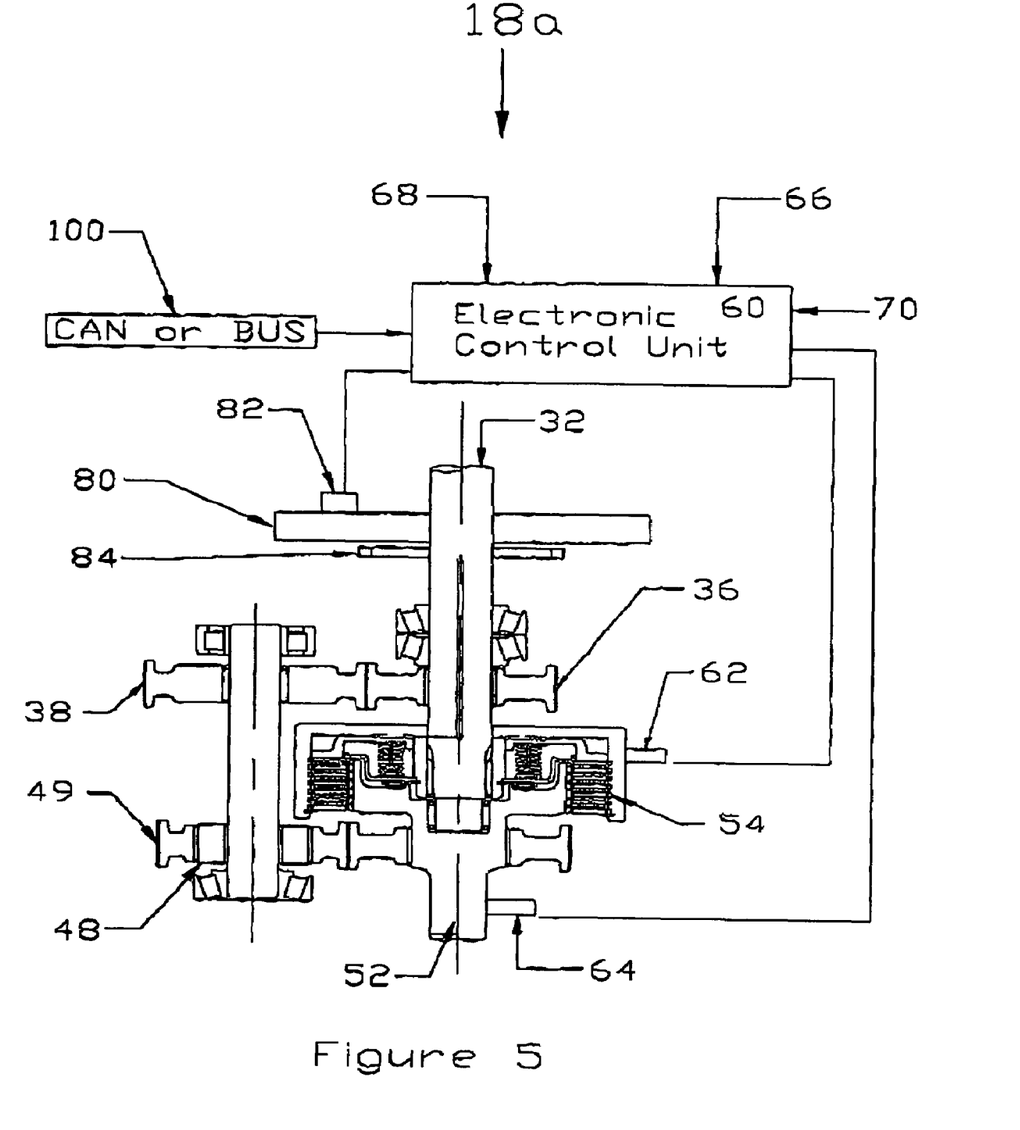
FIG. 5 shows the transmission of FIG. 4 with a control system superposed.

When the transmission is used with the "alpha" type stern drive of FIG. 6 where the choice of forward and reverse gearing is provided at the lower end of the output shaft adjacent the propeller, there is no requirement for a means for disengaging the one way clutch 48. FIGS. 4 and 5 illustrate such a transmission 18*a* in which components which are identical to those of transmission 18 share the same reference numerals. The only significant difference is the absence of the shift mechanism 42.

This transmission system has the advantage of being extremely compact and since it requires only a single friction clutch, provides reduced drag compared with transmission systems incorporating more than one friction clutch. Advantageously, the default for the transmission has the transmission in the first or lower gear, with the clutch normally off, so that if the system fails, it is always possible for the boat owner to get the boat home albeit at a slower speed.

Figure 7:
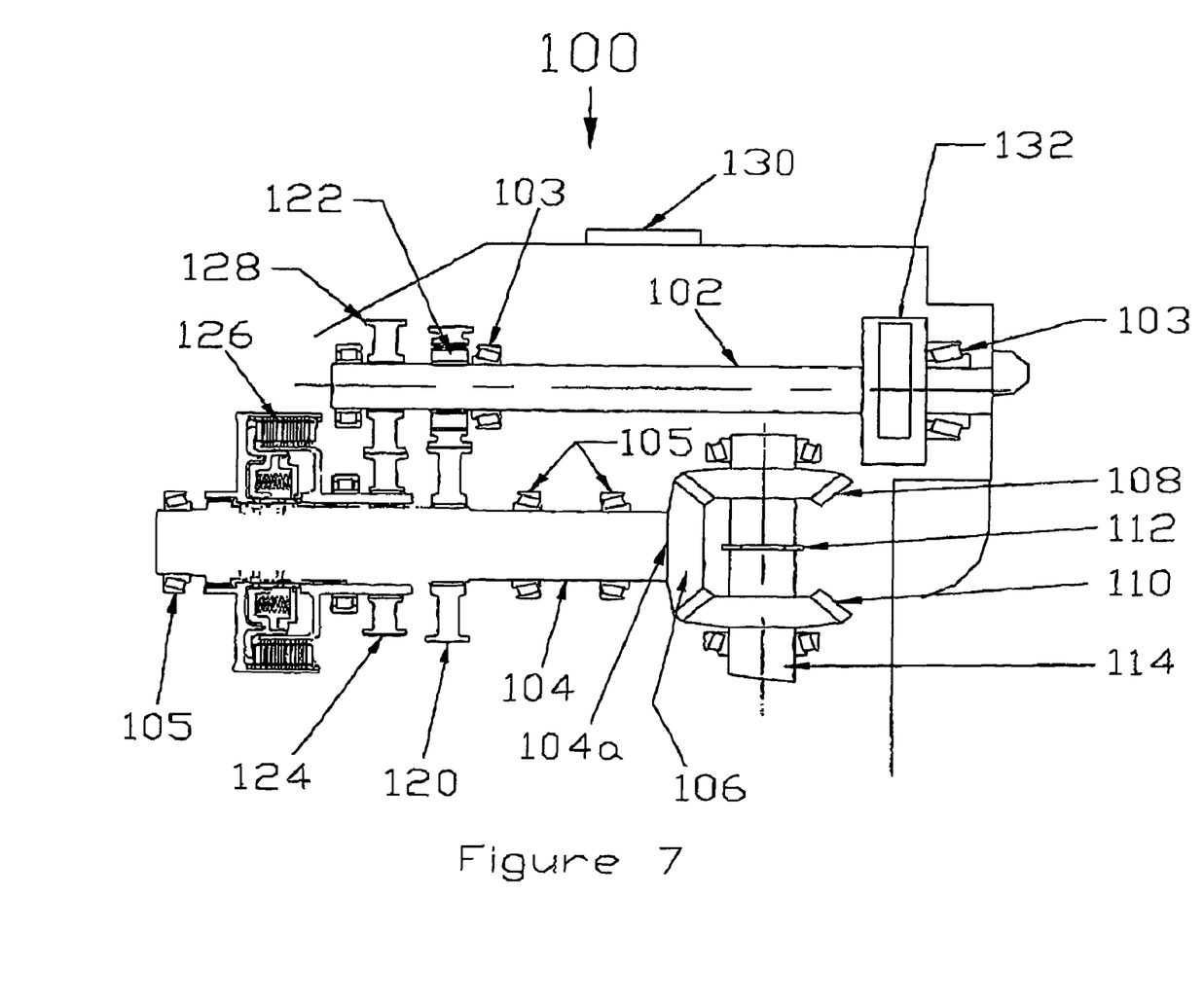
FIG. 7 is a schematic diagram of a two-speed transmission having a single friction clutch in which the output gears are located close to the output of the transmission.

FIG. 7 shows a further example of a marine transmission, in this case, a single friction clutch automated manual transmission 100. As in the case in the previously described transmission, this transmission is also shown as part of an inboard/outboard marine drive.

The output shaft of the watercraft, not shown, spins about a generally horizontal axis and is coaxial with and drives the input shaft 102 of the transmission which is mounted on bearings 103. The output shaft 104 of the marine transmission, is supported on bearings 105 parallel to and spaced from the input shaft 102.

A bevel gear 106 defined at the output end 104*a* of the output shaft 104 meshes with forward and reverse bevel gears 108,110, respectively and a dog clutch 112 (or similar device) moves in a vertical direction to connect a vertical output shaft 114 with either the reverse bevel gear 110 or the forward bevel gear 108, or vice versa depending on whether a right hand or left hand propeller is fitted.

The selection of forward or reverse motion for the marine craft direction of the propeller is carried out by the dog clutch 112 after the output of the marine transmission and therefore the input and output shafts of the marine transmission, always rotate in the same sense, and the transmission 100 is not required to cope with rotation of the input or output shafts in more than one direction.

As is standard in the art, a lower part of the vertical output shaft 114, not shown, is operatively connected to a further pair of meshing bevel gears, which convert the vertical axis movement of the vertical output shaft 114 to a generally horizontal axis movement of a horizontal shaft driving a propeller.

A gear wheel 120, for first gear is mounted on the output shaft 104 and this in turn, meshes with gear wheel 122 incorporating a one-way clutch mounted on the input shaft 102. A gear wheel 124 for second gear and an associated clutch 126, is mounted on the output shaft adjacent the first gear 120 and on the opposite side of first gear 120 to the output end 104*a* of the output shaft 104. The second gear 124 meshes with a gear wheel 128 mounted on the input shaft 102 adjacent the one-way clutch 122.

When the clutch 126 is not engaged, which is the default condition so that the marine craft is able to travel in first gear in the event of failure of the clutch 126, the input shaft 102 drives the output shaft 104 via first gear 120 which is used for docking and low speed maneuvering. The gears rotate and slip occurs across the first clutch pack 126. The main part of the clutch 126 rotates with the output shaft 104.

When the clutch 126 is engaged, second gear is engaged, and the clutch 126 and second gear turn with the output shaft 104. First gear 120 is forced to rotate at the same angular speed as second gear 124 and the one-way clutch 122 over runs.

In contrast with existing marine transmissions it will be appreciated that it is a relatively simple matter to change gear ratios by simply replacing two gear wheels, or four gear wheels if both first and second ratios are to be changed (although second gear is normally 1:1).

A further advantage is that the drive uses only one friction clutch to provide the two different gears and can therefore be more compact.

The transmission incorporates a control system including an electronic control 130, hydraulic pump 132 and sensors of the same type that are described in relation to the previously described examples.

Figure 8:
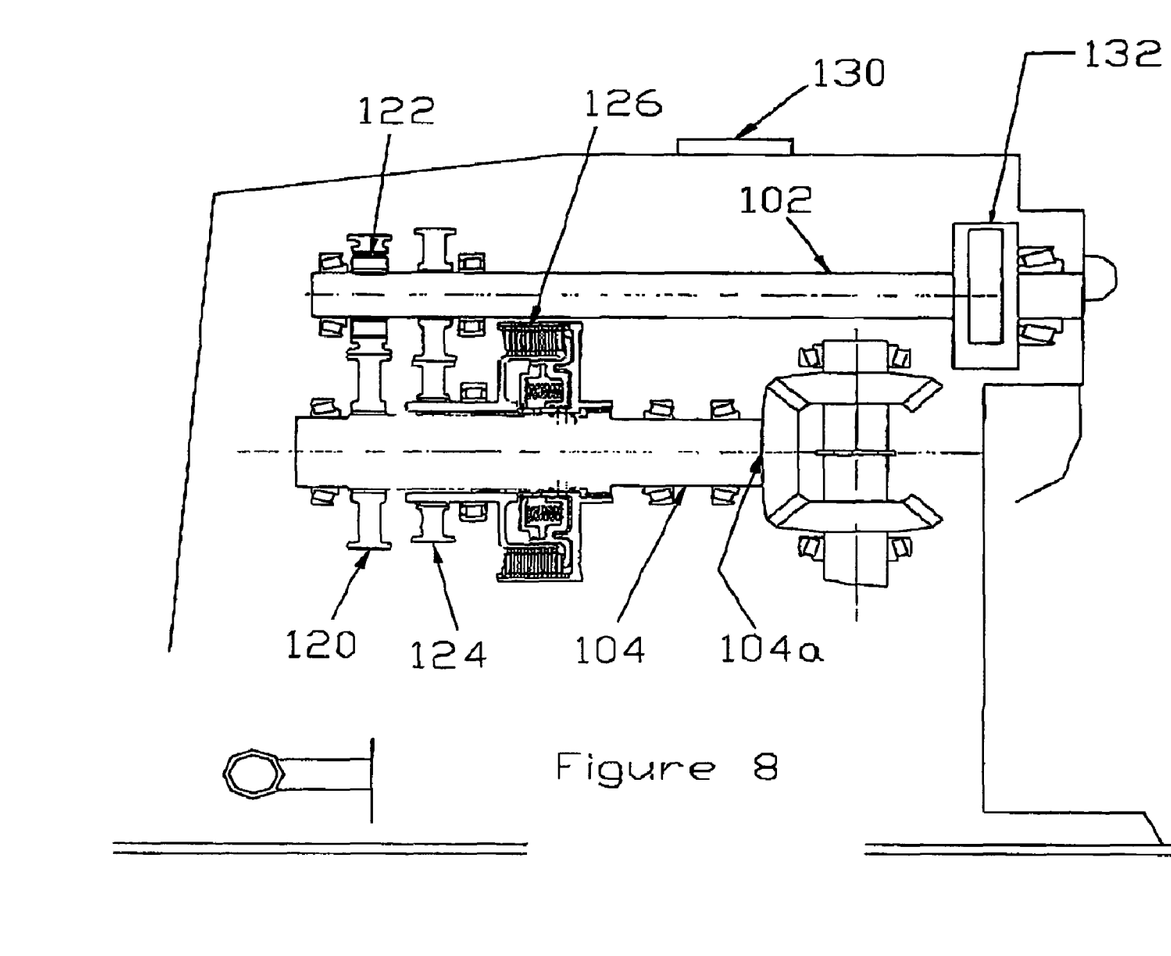
FIG. 8 shows a two-speed transmission with a single friction clutch in which the clutch is located close to the output.

FIG. 8 shows a similar arrangement to that which is shown in FIG. 7 except that in this arrangement the relative positions of the first 120 and second 124 gear wheels are reversed on the input 102 and output 104 shafts and the clutch 126 is located adjacent the output end of the output shaft 104. This arrangement has the advantage that it makes the overall transmission shorter at the top, and may help to ensure that the transmission can clear a swim platform, when one is provided on the watercraft. In FIG. 8, components which are common to the example of FIG. 7 carry the same reference numerals.

Although the transmission of the present invention is described in the context of a stern drive and is particularly suited for marine applications, it will be appreciated that it can be used as part of a transmission system of any vehicle and it is particularly suited to use where size and space are at a premium and where reduced cost and simplicity are particular advantages such as in marine outboards. It is also envisaged that the system might be particularly suitable for providing two speed transmissions for fork lift trucks, industrial applications and the like.

Further, although the system is described as being incorporated in the stern drive unit of an inboard/outboard marine propulsion system, it will be appreciated that the system could also be incorporated in outboard systems where the engine and transmission systems are all located behind the transom due to its compact size and light weight. It could also be used in variations of shaft drive, v-drive and surface drive marine propulsion systems between the engine and the propeller. The transmission could also be used to drive an impeller with "jet drive" applications.

It will be appreciated by persons skilled in the art that numerous variations and/or modifications may be made to the invention as shown in the specific examples without departing from the spirit or scope of the invention as broadly described. The present examples are, therefore, to be considered in all respects as illustrative and not restrictive.

The invention claimed is:

1. A two speed transmission including:
   an input shaft;
   a lay shaft spaced from the input shaft;
   a first gear train connecting the input shaft to the lay shaft;
   a second gear train connecting the lay shaft to an output shaft the gear train including a one way clutch;
   a first clutch for engaging the input shaft with the output shaft the arrangement being such that when the output shaft is disengaged from the input shaft forward drive is transmitted to the output shaft via the first and second gear trains and the lay shaft; and
   a second clutch for selectively disengaging the lay shaft from the first gear train to enable reverse drive to be transmitted from the input shaft to the output shaft by the first clutch.

2. A two speed transmission as claimed in claim 1 wherein the second clutch is a dog clutch.

3. A two speed transmission as claimed in claim 1 or 2 wherein the transmission is arranged such that when the first clutch is disengaged, power is transmitted from the input shaft via the gear trains and the lay shaft via the one way clutch to the output shaft which provides first gear and wherein when the clutch is engaged power is transmitted from the input shaft directly to the output shaft to provide a second, relatively higher gear.

4. A two speed transmission as claimed in claim 1 further including a control system is provided for controlling slippage of the first clutch.

5. A two speed transmission as claimed in claim 4 further including means for monitoring both the input shaft speed and the output propeller speeds and wherein the control system is arranged such that the slip speed of the first clutch may be controlled by using the output speed as an input to control the slip speed, allowing for controlled slippage of the first clutch at any speed and torque.

6. A two speed transmission system for a marine craft comprising:
   an input shaft;
   an output shaft,
   a first gear train for connecting the input shaft to the output shaft for driving the same in a first forward gear;
   a second gear train connecting the input shaft to the output shaft for driving the output shaft in a second forward gear;
   a friction clutch for selecting between the first and second gears;
   a one-way clutch for allowing overrun of the first gear train when the second gear is selected; and
   means for disengaging the one-way clutch to allow reverse drive to be transmitted from the input shaft to the output shaft.

\* \* \* \* \*